(12) United States Patent
Tackles

(10) Patent No.: US 7,448,750 B2
(45) Date of Patent: Nov. 11, 2008

(54) QUADRILATERAL LENS

(75) Inventor: George J. Tackles, Superior, WI (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 11/534,581

(22) Filed: Sep. 22, 2006

(65) Prior Publication Data

US 2008/0074610 A1    Mar. 27, 2008

(51) Int. Cl.
G02C 7/02 (2006.01)
A61F 9/00 (2006.01)

(52) U.S. Cl. ............................................. 351/159; 2/15

(58) Field of Classification Search ................. 351/159, 351/163–176; 2/15, 12, 426–441, 452, 453
See application file for complete search history.

(56) References Cited

U.S. PATENT DOCUMENTS

| | | |
|---|---|---|
| 1,332,410 A | 3/1920 | Potts |
| 1,354,040 A | 9/1920 | Hammon |
| 1,439,112 A | 12/1922 | Leibe |
| 1,536,828 A | 5/1925 | Drescher |
| 1,619,341 A | 3/1927 | Gagnon |
| 1,625,614 A | 4/1927 | King |
| 1,697,030 A | 1/1929 | Tillyer |
| 1,741,536 A | 12/1929 | Rayton |
| 1,908,723 A | 5/1933 | Adams et al. |
| 1,910,466 A | 5/1933 | Glancy |
| 1,942,400 A | 1/1934 | Glancy |
| 2,103,575 A | 12/1937 | Diggins |
| D145,288 S | 7/1946 | Di Cicco |
| 2,406,608 A | 8/1946 | Joyce |
| 2,442,849 A | 6/1948 | Glazer |
| 2,444,498 A | 7/1948 | Cochran |
| 2,472,731 A | 6/1949 | Splaine |
| 2,482,664 A | 9/1949 | Gagnon |

(Continued)

FOREIGN PATENT DOCUMENTS

CA         0 456 321        5/1949

(Continued)

OTHER PUBLICATIONS

Rudy Project International—Technically Cool Eyewear, Company History. *Performance Model* and *Super Performance Model* sunglasses, 1986. http://www.rudyproject.com/company/history.php?idLivello1=1&idLivello2=41&isAction=1&headquarter=1&prodottilnglesi=0&ecommerce=0&isADealer=0&idDealer=1&idL=1&unicode. Jan. 21, 2008.

*Primary Examiner*—Darryl J Collins
(74) *Attorney, Agent, or Firm*—Knobbe Martens Olson & Bear LLP

(57) ABSTRACT

An arcuately molded lens for eyewear such as goggles or eyeglasses is provided. The lens is single pane, unitary lens defining upper and lower edges. The lower edge may have a nosepiece opening formed therein for mounting the lens on a nose of a wearer. The lens has a horizontal arcuate cross-sectional configuration which defines opposing lateral segments and a central zone interposed therebetween. The lateral segments each have a first radius of curvature designated $R_1$, and the central zone has a second radius of curvature designated $R_2$. The lens can also have a vertical arcuate cross-sectional configuration which has a third radius of curvature designated $R_3$. In a preferred embodiment, $R_1 < R_2 \leq R_3$.

19 Claims, 8 Drawing Sheets

U.S. PATENT DOCUMENTS

| | | |
|---|---|---|
| D163,869 S | 7/1951 | Hinman |
| 2,582,345 A | 1/1952 | Moeller |
| 2,615,162 A | 10/1952 | Christensen et al. |
| 2,709,256 A | 5/1955 | Baratelli |
| D176,316 S | 12/1955 | Fleming |
| D178,178 S | 7/1956 | Fleming |
| D187,394 S | 3/1960 | Moeller |
| 2,928,097 A | 3/1960 | Neufeld |
| 3,055,256 A | 9/1962 | Andresen, Jr. |
| 3,133,982 A | 5/1964 | Janz |
| D199,150 S | 9/1964 | Carmichael |
| 3,149,632 A | 9/1964 | Colley |
| 3,162,862 A | 12/1964 | Miller |
| 3,223,086 A | 12/1965 | Denton |
| 3,229,303 A | 1/1966 | Jonassen |
| 3,233,249 A | 2/1966 | Baratelli et al. |
| 3,233,250 A | 2/1966 | Jonassen |
| D210,048 S | 1/1968 | Imperatrice |
| 3,377,626 A | 4/1968 | Smith |
| 3,394,980 A | 7/1968 | Dym |
| 3,395,964 A | 8/1968 | Nieder |
| 3,409,909 A | 11/1968 | Scott et al. |
| 3,423,758 A | 1/1969 | Heacox |
| 3,505,680 A | 4/1970 | Ring |
| 3,531,189 A | 9/1970 | Petito |
| 3,552,840 A | 1/1971 | Braget |
| 3,586,448 A | 6/1971 | Beasse |
| 3,591,864 A | 7/1971 | Allsop |
| 3,601,813 A | 8/1971 | Alieo |
| 3,689,136 A | 9/1972 | Atamian |
| 3,708,224 A | 1/1973 | Linblom |
| 3,756,704 A | 9/1973 | Marks |
| 3,806,951 A | 4/1974 | Halteman |
| D232,983 S | 10/1974 | Rabuse |
| 3,880,503 A | 4/1975 | Uribe |
| 3,884,561 A | 5/1975 | Kodys |
| 4,204,750 A | 5/1980 | Hilbert |
| 4,271,537 A | 6/1981 | Bowlus et al. |
| 4,271,538 A | 6/1981 | Montesi et al. |
| 4,315,335 A | 2/1982 | Kennedy, Jr. et al. |
| D268,683 S | 4/1983 | Tenny |
| 4,443,893 A | 4/1984 | Yamamoto |
| 4,446,576 A | 5/1984 | Hisataka |
| 4,447,914 A | 5/1984 | Jannard |
| 4,498,202 A | 2/1985 | Yamamoto |
| 4,515,448 A | 5/1985 | Tackles |
| 4,564,272 A | 1/1986 | Rinnooy Kan |
| 4,571,748 A | 2/1986 | Carroll et al. |
| D285,020 S | 8/1986 | Schmidthaler |
| 4,611,371 A | 9/1986 | Fujino et al. |
| 4,613,217 A | 9/1986 | Fuerter et al. |
| D288,980 S | 3/1987 | Pernicka |
| 4,674,851 A | 6/1987 | Jannard |
| 4,682,007 A | 7/1987 | Hollander |
| 4,730,915 A | 3/1988 | Jannard |
| 4,732,464 A | 3/1988 | Bononi |
| 4,736,466 A | 4/1988 | Kallstrom |
| 4,737,918 A | 4/1988 | Langlois et al. |
| 4,741,611 A | 5/1988 | Burns |
| 4,761,315 A | 8/1988 | Logan et al. |
| 4,783,163 A | 11/1988 | Breault |
| 4,802,754 A | 2/1989 | Neef |
| 4,843,655 A | 7/1989 | Hegendörfer |
| 4,859,048 A | 8/1989 | Jannard |
| 4,867,550 A | 9/1989 | Jannard |
| 4,904,076 A | 2/1990 | Kappler et al. |
| 4,951,322 A | 8/1990 | Lin |
| 4,976,529 A | 12/1990 | Segoshi et al. |
| 5,050,979 A | 9/1991 | Shinohara |
| 5,056,156 A | 10/1991 | Kosmo et al. |
| 5,064,463 A | 11/1991 | Ciomek |
| 5,131,101 A | 7/1992 | Chin |
| 5,138,494 A | 8/1992 | Kurtin |
| 5,182,586 A | 1/1993 | Bennato |
| 5,204,700 A | 4/1993 | Sansalone |
| 5,208,614 A * | 5/1993 | Jannard ................. 351/41 |
| 5,220,689 A | 6/1993 | Miller |
| 5,245,709 A | 9/1993 | Shipcott |
| 5,287,562 A | 2/1994 | Rush, III |
| 5,291,230 A | 3/1994 | Bradley |
| 5,297,298 A | 3/1994 | Salatka et al. |
| 5,321,443 A | 6/1994 | Huber et al. |
| D349,978 S | 8/1994 | Copeland et al. |
| 5,347,323 A | 9/1994 | Wilson |
| 5,359,370 A | 10/1994 | Mugnier |
| 5,384,604 A | 1/1995 | Chang |
| 5,390,369 A | 2/1995 | Tubin |
| 5,410,763 A | 5/1995 | Bolle |
| 5,412,814 A | 5/1995 | Pernicka et al. |
| 5,423,092 A | 6/1995 | Kawai |
| 5,428,411 A | 6/1995 | Kopfer |
| D360,488 S | 7/1995 | Cardinal |
| 5,441,695 A | 8/1995 | Gladden |
| D365,591 S | 12/1995 | Jannard et al. |
| 5,502,515 A | 3/1996 | Sansalone |
| D369,375 S | 4/1996 | Jannard et al. |
| 5,536,828 A | 7/1996 | DeLuca et al. |
| 5,541,674 A | 7/1996 | Jannard |
| 5,555,038 A | 9/1996 | Conway |
| 5,604,547 A | 2/1997 | Davis et al. |
| 5,648,832 A | 7/1997 | Houston et al. |
| 5,689,323 A | 11/1997 | Houston et al. |
| 5,708,489 A | 1/1998 | Jannard |
| 5,774,201 A | 6/1998 | Tackles |
| 5,802,622 A | 9/1998 | Baharad et al. |
| 5,805,261 A | 9/1998 | Houston et al. |
| 5,815,848 A | 10/1998 | Jarvis |
| 5,969,789 A | 10/1999 | Houston et al. |
| 6,010,217 A | 1/2000 | Houston et al. |
| 6,010,218 A | 1/2000 | Houston et al. |
| 6,056,399 A | 5/2000 | Jannard et al. |
| 6,076,926 A | 6/2000 | Kostka |
| 6,106,116 A | 8/2000 | Houston et al. |

FOREIGN PATENT DOCUMENTS

| | | |
|---|---|---|
| CA | 0485155 | 7/1952 |
| CH | 297472 | 3/1954 |
| DE | 2 740 231 | 5/1978 |
| DE | 38 17 850 A1 | 12/1989 |
| EP | 0 015 796 A2 | 9/1980 |
| EP | 0 116 093 A1 | 8/1984 |
| EP | 0 121 018 A2 | 10/1984 |
| EP | 0 239 659 A1 | 10/1987 |
| EP | 0 339 359 A1 | 11/1989 |
| EP | 0 446 698 A2 | 9/1991 |
| EP | 0 496 292 A1 | 7/1992 |
| FR | 673815 | 1/1930 |
| FR | 790755 | 11/1935 |
| FR | 798331 | 3/1936 |
| FR | 852 306 | 10/1939 |
| FR | 1 126 329 | 11/1956 |
| FR | 2 088 866 | 1/1972 |
| FR | 2 148 866 | 3/1973 |
| FR | 2 271 593 | 12/1975 |
| FR | 2 388 293 | 11/1978 |
| FR | 2472764 | 7/1981 |
| FR | 2 500 176 | 8/1982 |
| FR | 2 511 903 | 3/1983 |
| FR | 2 617 294 A1 | 12/1988 |
| FR | 2 626 086 | 7/1989 |
| FR | 2 626 683 A1 | 8/1989 |
| FR | 2 688 322 A1 | 9/1993 |
| FR | 2700621 | 7/1994 |

| | | | | | | |
|---|---|---|---|---|---|---|
| FR | 2 740 231 | 4/1997 | JP | 5-61003 | | 3/1993 |
| GB | 512 419 | 9/1939 | JP | 6-123854 A | | 5/1994 |
| GB | 1 226 488 | 3/1971 | SU | 1 765 802 A1 | | 9/1992 |
| GB | 1 299 981 | 12/1972 | WO | WO 92/07293 | | 4/1992 |
| GB | 2 278 459 | 11/1994 | WO | WO 9818042 | * | 4/1998 |
| JP | 2-19021 | 2/1990 | WO | WO 98/30930 | | 7/1998 |
| JP | 3-144415 | 6/1991 | | | | |
| JP | 4-114124 | 4/1992 | * cited by examiner | | | |

$R_1 \leq R_2 \leq R_3$

QUADRILATERAL LENS

BACKGROUND

The present invention relates generally to a lens for sunglasses, and more particularly to a uniquely configured quadroradial lens having a dual radius horizontal curvature and a constant radius vertical curvature for minimizing the prismatic shift of the lens. As discussed in greater detail below, embodiments of the present invention maximize the interception of peripheral light, while, at the same time, mitigating prismatic shift to enhance optical resolution for the wearer. An optional frusto-conical as worn configuration of the lens also permits construction of sunglasses which conform closely to the front and sides of the wearer's head. The resulting low profile glasses utilizing the lens of the present invention are particularly suited for demanding situations which require precise optical resolution and interception of peripheral light, such as competition skiing or bicycle racing.

Sunglasses have long been designed with the general objective of blocking the sun or other sources of bright light from one's eyes. Initially, numerous designs of dual lens glasses were developed, differing essentially only in aesthetic features. However, the unitary lens was later developed, and together with existing dual lens designs, has been geometrically modified in response to various optical considerations such as optical clarity and resolution, field of vision, light wave refraction, and others.

Although prior dual lens designs are useful for some purposes, the conventional dual lens system is inherently incapable of meeting the demands of certain activities. For example, the frame on dual lens glasses presents a substantial obstruction to one's peripheral vision, which can be extremely disadvantageous in any fast-paced activity. Even in dual lens glasses without a frame along the lower edges of the lenses, the edge of each lens disrupts peripheral vision. Simply providing a larger lens that is typically stamped or molded from a flat plane or a spherical blank, causes the glasses to extend too far tangentially away from the side of the head, leaving the glasses with an undesirably bulky profile.

At the same time, conventional dual lens glasses only intercept sunlight directly in front of the eye, leaving a large, unprotected periphery about each lens. Momentary flashes of light around the lens during activity cause constriction of the pupils, with a fleeting blindness as one attempts to readjust through the darkened lens.

Prior art attempts to block this peripheral light (aside from opaque blinders) included bending (e.g., thermoforming) a flexible lens in a posterior direction near the lateral edge. Although this improved the interception of peripheral light, the resulting optical resolution was unacceptable for high speed competition situations. This is due to the phenomena that even minor irregularities in the radius of curvature, which inherently result when bending a lens, cause an irregular diffraction of light waves passing through that region of the lens and distort the field of vision.

A unitary, molded, frusto-conical lens blank was then developed, such as that disclosed in U.S. Pat. No. 4,515,448 issued to Tackles. The frusto-conical lens was designed to conform closely to the wearer's head, having lateral edges that curved and extend interiorly to block peripheral light that would otherwise pass around the lenses of a dual lens design. In addition, diffraction gradients common in the bent, flexible lens, were minimized by molding the frusto-conical lens with a predetermined curvature. Nevertheless, the potential for improvement remained for several reasons.

The next improvement in specialty unitary eyewear utilized a unitary cylindrical lens which was curved about an axis having a substantially constant radius throughout, such that the lens defined a portion of the wall of a cylinder. This lens is the subject of U.S. Pat. No. 4,859,048, issued to Jannard. The cylindrical lens demonstrated improved optical properties and interception of peripheral light. Further, it provided a sleek, low profile design that also improved ventilation. Nevertheless, the cylindrical lens produced a measurable prismatic shift in each of the vertical and horizontal planes, particularly at off axis viewing angles.

Another improvement in specialty unitary eyewear utilized a toroidal lens that was curved along each of two substantially perpendicular axes to produce a lens of generally toroidal configuration. This lens is the subject of U.S. Pat. No. 4,867,550, also issued to Jannard. The toroidal lens configuration was characterized by having arcuately configured horizontal and vertical cross-sections. The arc of each respective cross-section corresponded to a given radius. Thus, the toroidal lens can be defined by two different radii, and is configured to substantially conform to the wearer's head. In addition, the lens thickness was tapered to further reduce prismatic shift.

Yet another improvement in unitary lens eyewear utilized an elliptical lens. This lens is the subject of U.S. Pat. No. 5,774,201, also issued to Tackles. The elliptical lens is characterized as having a horizontal cross-section that substantially conforms to an elliptical shape. The vertical cross-section of the elliptical lens can be defined by any of various geometric shapes, such as a cylinder, a cone, an ellipsoid, or an ellipsoid of revolution. The elliptical lens was introduced to improve the optical characteristics of specialty eye wear, including refraction between medial light entering at the front of the lens and peripheral light entering at the lateral ends of the lens.

Notwithstanding the many advantages presented by this progression of unitary lens designs, there is a continuing need for a specialty lens having excellent optical qualities and providing reduced light wave defraction of medial, lateral and peripheral light, while at the same time providing a low profile, aerodynamic configuration that allowed for adequate ventilation and maximum comfort. Preferably, the lens will exhibit good impact resistance, as well as minimal prismatic shift in both the horizontal and vertical axes.

BRIEF SUMMARY

In accordance with an embodiment of the present invention, there is provided an arcuately molded lens for eyeglasses. The lens is suitable for participation in active sports, such as biking, skiing, and the like. The lens comprises a single pane, unitary lens defining upper and lower edges. The lower edge has a nosepiece opening formed therein for mounting the lens on a nose of a wearer. The lens has a first arcuate cross-sectional configuration in a horizontal direction.

The first arcuate cross-sectional configuration defines opposing lateral segments and a central zone interposed therebetween. In an embodiment, the central zone can be substantially symmetrically located with respect to the nosepiece and the lateral segments. The lateral segments each have a first radius of curvature designated $R_1$, and the central zone has a second radius of curvature designated $R_2$.

In another embodiment, the lens can have a second arcuate cross-sectional configuration in a vertical direction. The second arcuate cross-sectional configuration can have a third radius of curvature designated $R_3$. According to various embodiments disclosed herein, $R_1$ is preferably not equal to $R_2$. For example, $R_1$ can be less than or equal to $R_2$ ($R_1 \leq R_2$). Further, $R_2$ is preferably not equal to $R_3$. In this regard, $R_2$ can be less than or equal to $R_3$ ($R_2 \leq R_3$).

In some embodiments, $R_1$ can be in the range of about 1½ to 3 inches, and most preferably, approximately 2½ inches; $R_2$ can be in the range of about 4 to 10 inches, and most preferably, approximately 5 inches; and $R_3$ can be in the range of about 4 to 11 inches, and most preferably, approximately between 5-10 inches.

In addition, the lens can be configured wherein $R_3$ varies along a horizontal plane of the lens. For example, $R_3$ can increases along the horizontal plane from the central zone toward the lateral segment of the lens. Thus, $R_3$ can vary between about 4 to 11 inches.

The lens can also be formed to include transition sites disposed intermediate the opposing lateral segments and the central zone. The transition sites can define a transition radius of curvature designated $R_T$. In one embodiment, the first radius of curvature can be coincident to the second radius of curvature at the respective transition sites. According to another embodiment, $R_1$ can be less than or equal to $R_T$, and $R_T$ can be less than or equal to $R_2$ ($R_1 \leq R_T \leq R_2$). For example, the lens can be configured with $R_T=R_2$ at an end point of the central zone and further be configured such that $R_T$ decreases in the transition site until $R_T=R_1$ at a beginning point of the lateral segment. In one implementation, the transition radius of curvature $R_T$ can decrease at a constant rate from $R_2$ to $R_1$.

In accordance with yet another embodiment, the lens can define inner and outer surfaces and a thickness therebetween. An average thickness of the lens in the lateral segments of the lens is less than an average thickness of the lens in the central zone. In addition, the lens can be formed such that the thickness of the lens in at least one point in the central zone can be greater than the thickness of the lens at any point within at least one of the lateral segments. In some embodiments, the thickness of the lens can taper from a central point of the lens gradually to a reduced thickness in the lateral segments. The average lens thickness can preferably be in the range of about 0.061 to 0.068 inches. However, the thickness of the lens in the central zone can be between about 0.060 and 0.070 inches and taper to between about 0.050 and 0.060 inches in the lateral segments.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Figure 1:
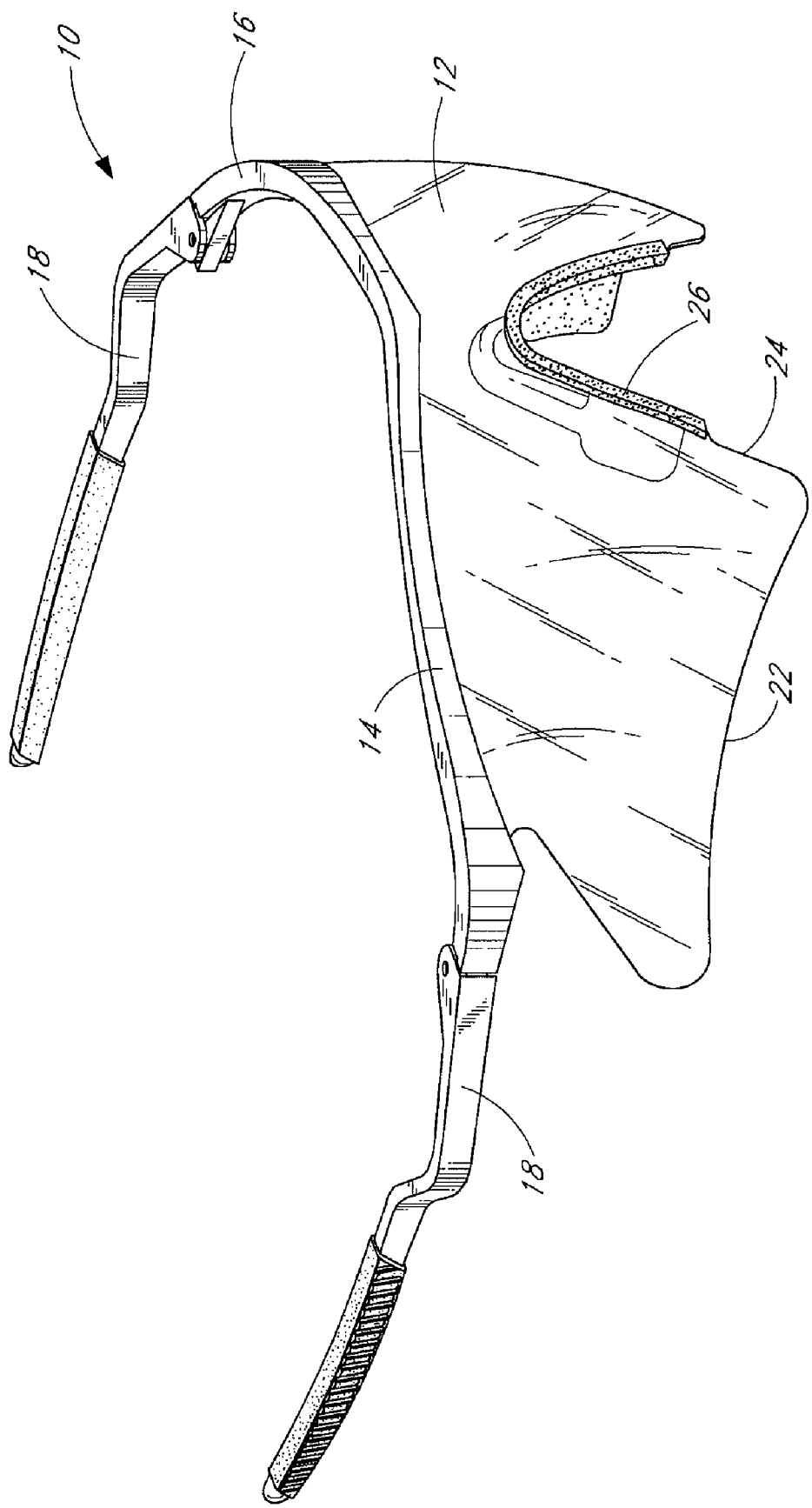
FIG. 1 is a perspective view of eyewear incorporating a unitary lens made in accordance with an embodiment of the present invention.
Figure 2:
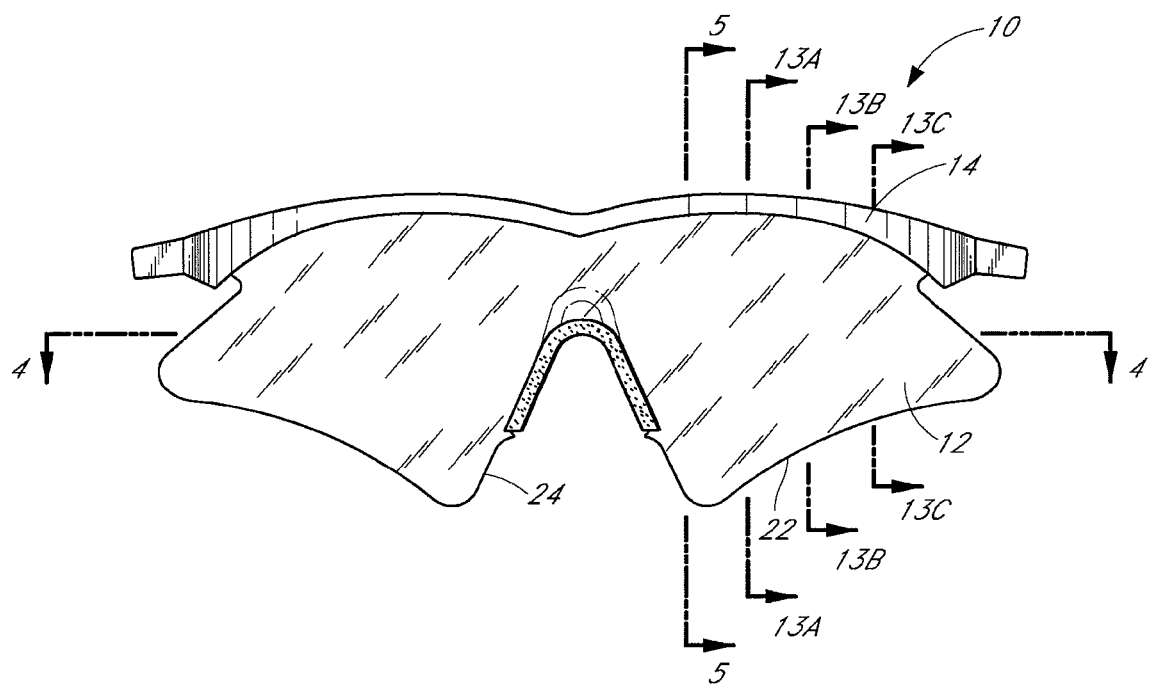
FIG. 2 is a front elevational view of the eyewear of FIG. 1.
Figure 3:
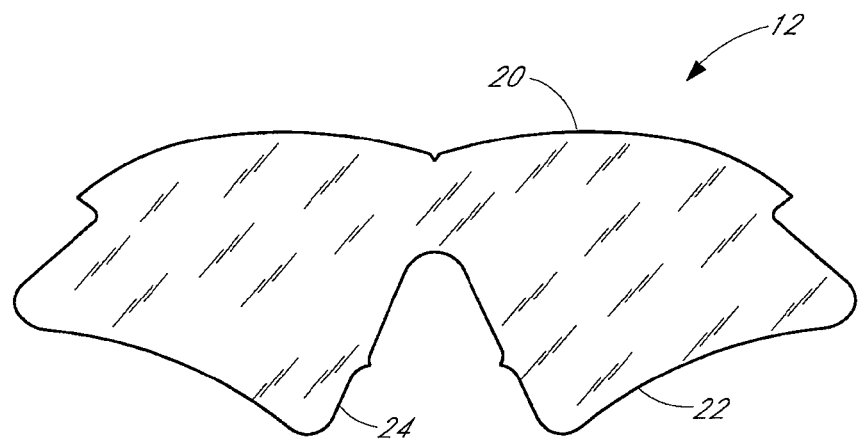
FIG. 3 is a front elevational view of the lens of FIGS. 1 and 2.
Figure 4:
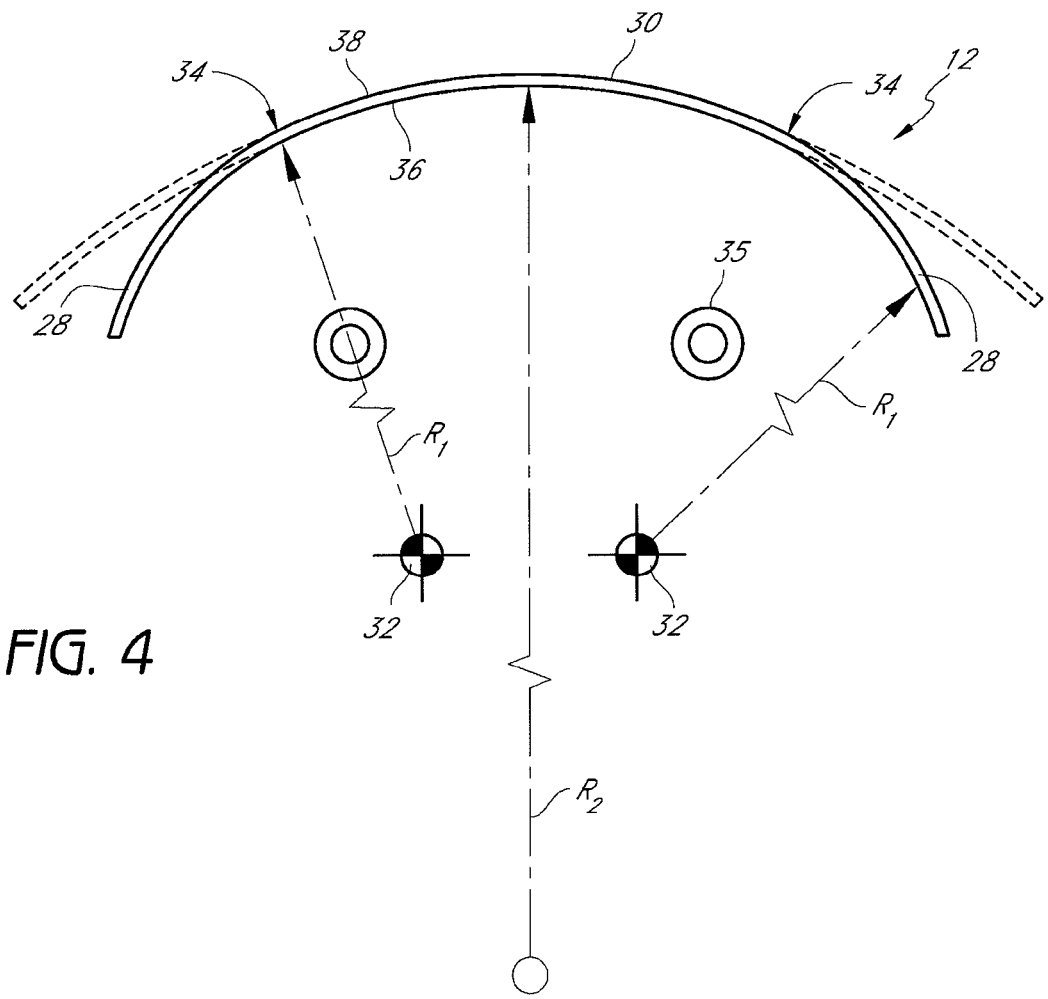
FIG. 4 is a horizontal cross-sectional view of the lens taken along lines 4-4 in FIG. 2 illustrating a central zone and opposing lateral segments of the lens in accordance with an embodiment.
Figure 5:
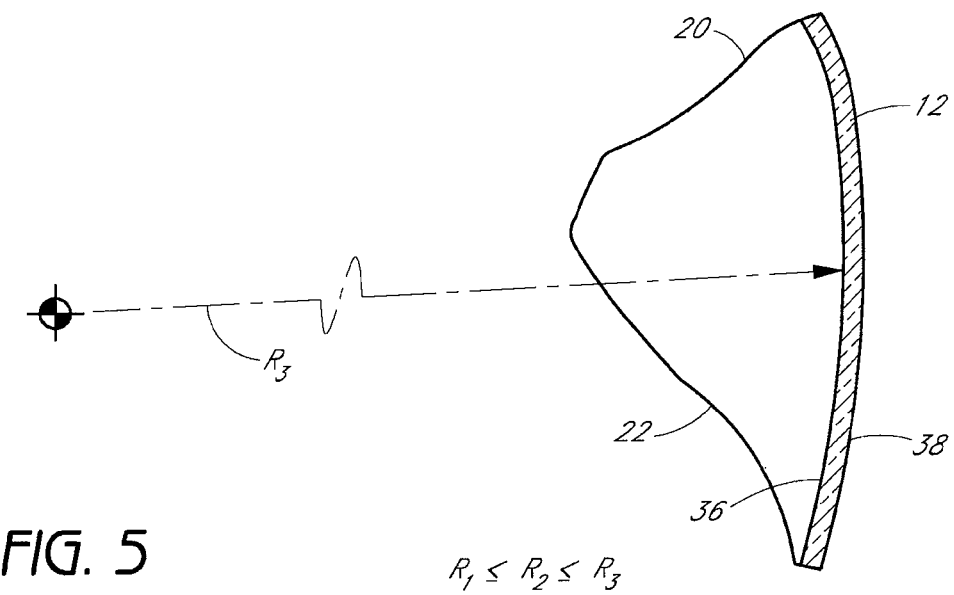
FIG. 5 is a vertical cross-sectional view of an embodiment of the lens taken along lines 5-5 in FIG. 2.

Referring now to the drawings wherein the showings are made for purposes of illustrating preferred embodiments of the present invention, and not for purposes of limiting the same, FIG. 1 is a perspective view of an eyeglass or eyewear 10 having a unitary lens 12 and a mounting frame 14. The lens 12 is configured to extend in the path of a wearer's left and right eye fields of vision. As shown in FIG. 1, the curvature of the lens 12 permits it to conform closely from side to side to the wearer's face, thus maximizing the interception of sun and other strong light sources, while at the same time providing comfort and pleasing aesthetic characteristics. FIGS. 1 and 2 illustrate an exemplary embodiment of the eyeglass, including exemplary dimensions and shapes of the lens 12 and mounting frame 14. However, embodiments of the present invention principally relate to the curvature of the lens 12, an exemplary embodiment of which is illustrated in FIGS. 3-5. As explained in greater detail below, such embodiments provide enhanced optical qualities, for example, by tending to reduce prismatic shift of light rays passing through the lens 12, throughout the wearer's field of view. Further, other properties of the lens 12, such ballistic impact strength and aesthetic appeal can also be modified and enhanced utilizing the teaching herein. These, as well as other advantages are described herein.

Referring to FIG. 1, it should be noted that the particular mounting frame 14 is not essential to the embodiments disclosed herein. The frame 14 can be of varying configurations and designs, and the illustrated embodiment shown in FIGS. 1 and 2 is provided for exemplary purposes only. As illustrated, the frame 14 may include a top frame portion 16 and a pair of ear stems 18 that are pivotably connected to opposing ends of the top frame portion 16. Further, the lens 12 may be mounted to the frame 14 with an upper edge 20 of the lens 12 extending along or within a lens groove and being secured to the top frame portion 16. For example, the upper edge 20 of the lens 12 can be formed in a pattern, such as a jagged or non-linear edge, and apertures or other shapes around which the top frame portion 16 can be injection molded or fastened in order to secure the lens 12 to the top frame portion 16. Further, the lens 12 can be removably attachable to the frame 14 by means of a slot with inter-fitting projections or other attachment structure formed in the lens and/or top frame portion 16.

It is also contemplated that the lens 12 can also be secured along a lower edge 22 thereof, with the frame 14 being configured to attach to the lower edge 22 of the lens 12. Various other configurations can also be utilized. Such alternative configurations can include the direct attachment of the ear stems 18 to the lens 12 without any frame, or other configurations that can reduce the overall weight, size, or profile of the eyeglasses. In addition, various materials can be utilized in the manufacture of the frame 14, such as metals, composites, or relatively rigid, molded thermoplastic materials which are well known in the art, and which can be transparent or available in a variety of colors. Indeed, the mounting frame 14 can be fabricated according to various configurations and designs as desired.

Similarly, the front two-dimensional profile of the lens 12, as illustrated in the front views of FIGS. 2 and 3, can also be variously configured. The lens 12 can be of a single pane of material. Thus, the lens 12 can be unitary or have a dual lens design. A nosepiece opening 24 can be formed along the lower edge 22 of the lens 12, which can be sized and configured to accommodate the nose of a wearer. In addition, the nosepiece opening 22 can also accommodate a nosepiece 26 adapted to flex and closely fit the opposite sides of the wearer's nose. Furthermore, the lower edge 22 of the lens 12 can also be shaped to substantially conform to the wearer's facial profile, thus allowing some embodiments to be closely fitted to the wearer's head while not contacting the skin of the wearer's face.

In addition, lenses in accordance with the present invention can be manufactured by any of a variety of processes well known in the art. Preferably, the lens 12 is injection molded and comprises a relatively rigid and optically acceptable material such as polycarbonate. The curvature of the lens 12 would thus be incorporated into a molded lens blank. A lens blank will include the desired curvature and taper in its as-molded condition. One or two or more lenses of the desired shape may then be cut from the optically appropriate portion of the lens blank as is understood in the art. Preferably, the frame 14 is provided with a slot or other attachment structure that cooperates with the molded and cut shape of the lens to minimize deviation from, and even improve retention of its as-molded shape.

Alternatively, the lens 12 can be stamped or cut from flat sheet stock and then bent into the curved configuration in accordance with an implementation of the present invention. This curved configuration can then be maintained by the use of a relatively rigid, curved frame 14, or by heating the curved sheet to retain its curved configuration, as is well known in the thermoforming art. However, this method is less desirable because bending the lens 12 can result in stress fractures or other compression or expansion induced flaws which can impair the optical qualities of the lens 12.

FIG. 4 illustrates a first arcuate cross-sectional configuration of the lens 12, as shown in a horizontal direction. The sectional view of FIG. 4 illustrates an embodiment wherein the first arcuate cross-sectional configuration defines opposing lateral segments 28 and a central zone 30 interposed therebetween. The lateral segments 28 each have a first radius of curvature, designated $R_1$. These radii of curvature $R_1$ are measured from independent focal points 32 shown in FIG. 4. In addition, the central zone 30 has a second radius of curvature, designated $R_2$. FIG. 4 also shows transition sites 34 of the lens 12. The transition sites 34 are disposed on either side of the central zone 30 intermediate the central zone 30 and the opposing lateral segments 28. According to a preferred embodiment, the transition sites 34 can be a coincidence point along the lens 12 where the radius of curvature of the lens 12 transitions from $R_1$ to $R_2$, and vice versa. Also represented in FIG. 4 is a pair of eyes 35 of the wearer.

Referring now to FIG. 5, the lens 12 can also have a second arcuate cross-sectional configuration in a vertical direction. The second arcuate cross-sectional configuration has a third radius of curvature, designated $R_3$. As shown in FIGS. 4 and 5, the lens 12 has an inner surface 36 and an outer surface 38. In this regard, each of the radii of curvature $R_1$, $R_2$, and $R_3$ are preferably measured from the inner surface 36 of the lens 12, although the outer surface 38 can also be used in other embodiments. As explained further herein, embodiments of the lens 12 provides various advantageous optical qualities for the wearer, including reducing the prismatic shift of light rays passing through the lens 12.

Figure 6:
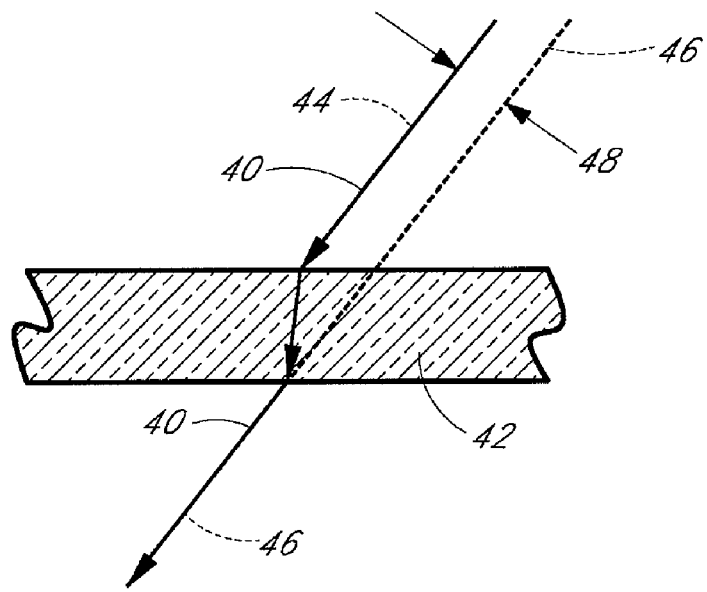
FIG. 6 is a representation of prismatic shift of a light ray passing at a non-normal angle through a transmissive optical element.
Figure 7:
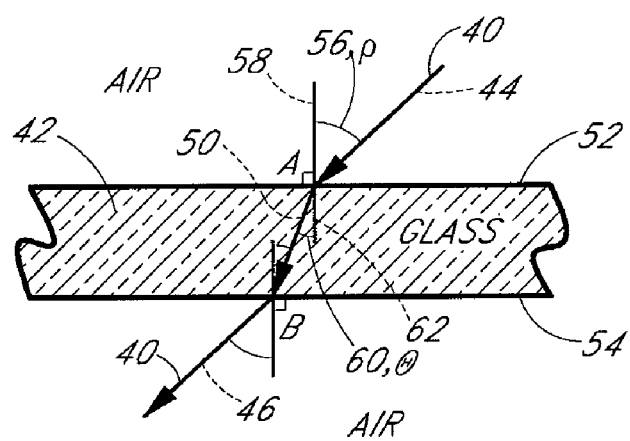
FIG. 7 is a representation of the refraction of the light ray of FIG. 6 as it passes through the transmissive optical element.

The human eye collects millions of light rays at a time and uses them to form an image. If the light rays collected by the eye are shifted, the image will also appear to be shifted. As illustrated in FIGS. 6 and 7, prismatic shift can be characterized as a first order optical distortion in which light rays shift as they pass through a transmissive medium. In essence, prismatic shift occurs when a light ray 40 entering a transmissive optical element 42 is deflected while traveling through the optical element 42. The light ray 40 is redirected from an initial true direction 44 to a perceived direction 46 upon passing through the optical element 42. The difference between the true direction 44 and the perceived direction 46 is referred to herein as prismatic shift 48. Prismatic shift can occur in an eyeglass lens as light rays pass through the lens and are detected by eye of the wearer. The wearer actually sees an incorrect "perceived" location of the image due to the prismatic shift of the light rays. Prismatic shift presents a challenging problem for lens manufacture and design, and is explained in greater detail below.

Prismatic shift is related to the optical principle of refraction of light. Refraction can be defined as the "deflection of a wave on passing obliquely from one transparent medium into a second medium in which its speed is different, as the passage of a light ray from air into glass." See The Columbia Electronic Encyclopedia, 6th Edition (Columbia University Press 2003). Referring to FIG. 7, the light ray 40 traveling through air along the initial true direction 44 (or vector) will be deflected in a different refracted direction 50 upon reaching and passing through an optical element 42, such as glass. Point A illustrates where the light ray 40 intercepts the optical element 42. Although FIG. 7 illustrates the optical element 42 as being made of glass, various other optically transmissive transparent and translucent materials, such as plastics, similarly illustrate the principal of refraction. When the light ray 40 exits the optical element 42 at point B, the light ray 40 is again deflected. In the example shown in FIG. 7, where the optical element 42 is flat and has parallel, planar first and second surfaces, the light ray 40 will be deflected at point B such that the perceived direction 46 is parallel to the initial true direction 44, but laterally shifted by an offset distance or prismatic shift 48. The refracted direction 50 of the light ray 40 as it travels through the optical element 42, as well as the perceived direction 46, can be determined according to the law of refraction.

The law of refraction considers an angle at which the light ray 40 approaches the first surface 52 of the optical element 42, which angle is referred to as the angle of incidence 56. This angle 56 is measured from the light ray 40 to a normal line 58 which is normal to the first surface 52. A normal line is one that is perpendicular to a tangent line at the point where the tangent line intersects a curve (two dimensional, tangent line) or surface (three-dimensional, tangent plane). A line or plane is tangent if it that intersects the respective curve or plane at only one point. In addition, the law of refraction also considers an angle of refraction 60, which is the angle between the refracted direction 50 of the light ray 40 and a normal line 62. The relationship between the angle of incidence 56 and the angle of refraction 60 is established using a mathematical relationship that compares the speed at which light travels through both media (air and the optical element), and a physical property of each medium known as the index of refraction. This mathematical relationship is known as Snell's Law, and can be stated in terms of the indexes of refraction of the two media and the angles of incidence and refraction. This equation is shown below:

$$\frac{\sin(\rho)}{\sin(\theta)} = \frac{N_\rho}{N_\theta}$$

In the above equation, the variable $\rho$ is representative of the angle of incidence 56; the variable $\theta$ is representative of the angle of refraction 60; the variable $N_\rho$ is the index of refraction for a first medium (such as air); and $N_\theta$ is the variable representative of the index of refraction of the second medium (in this case, glass). In most cases, the indices of refraction of the media are known, as well as the angle of incidence 56 of the light ray 40. Thus, through manipulation of the mathematical equation, the angle of refraction 60, $\theta$, can be determined.

$$\theta = \sin^{-1}\left(\frac{N_\theta \times \sin(\rho)}{N_\rho}\right)$$

Thus, as illustrated in FIG. 7, the light ray 40 will be deflected within the optical element 42 at the angle of refraction 60, $\theta$, and proceed through the optical element 42 along a new refracted direction 50 until reaching the second surface 54 of the optical element 42, which point is represented as point B in FIG. 7.

At point B in FIG. 7, the light ray 40 is deflected again as it passes from one medium into another, in this case, from glass back into air. The above mathematical analysis would again be performed in order to determine the perceived direction 46 of the light ray 40. However, as mentioned above, if both the first and second surfaces 52, 54 are parallel, the perceived direction 46 of the light ray 40 as it exits the optical element 42 will be parallel to the initial true direction 44 of the light ray 40. This fact simplifies the present discussion, and is illustrated in FIG. 7.

The prismatic shift 48 of the light ray 40 can be determined by comparing the offset between the perceived direction 46 of the light ray 40 and its initial true direction 44, as shown in FIG. 6. By understanding the effect of the prismatic shift 48 on the light ray 40, it is understood that the perceived direction 46 of the light ray 40 is an incorrect representation of the true direction 44 of the light ray 40. Thus, the perceived direction 46 of the light ray 40 detected by the eye of the wearer represents an image that is "shifted" from the true location of the image. Thus, light passing through a eyeglass lens can be distorted and be improperly perceived by the wearer.

Prismatic shift can be an especially significant drawback for an eyeglass wearer engaged in active sports, such as biking, skiing, and the like. As mentioned above, the deflection of the light ray 40 as it passes from one medium into another can cause the wearer to perceive an incorrect location of an object. As similarly described above, as millions of light rays enter the eyeglass wearer's eye, the retina of the eye detected the light rays and forms an image of the object. The location of the object, its dimensions, and other perceived physical attributes of the object, as detected by the eye, are determined in large measure as a result of the direction of the light rays as they enter the eye. If the light rays pass without obstruction from the object to the eye, the eye will detect a true image of the object according to its location and other physical attributes. However, if the light rays reflected off of the object pass through an intermediate optical medium prior to entering the eye, the light rays may undergo a prismatic shift, which will cause the eye to falsely perceive the true location or other physical attributes of the object. In active sports, such as cycling, basketball, baseball, and the like, the immediate detection of the location and dimension of moving objects is critical to the wearer.

Figure 8:
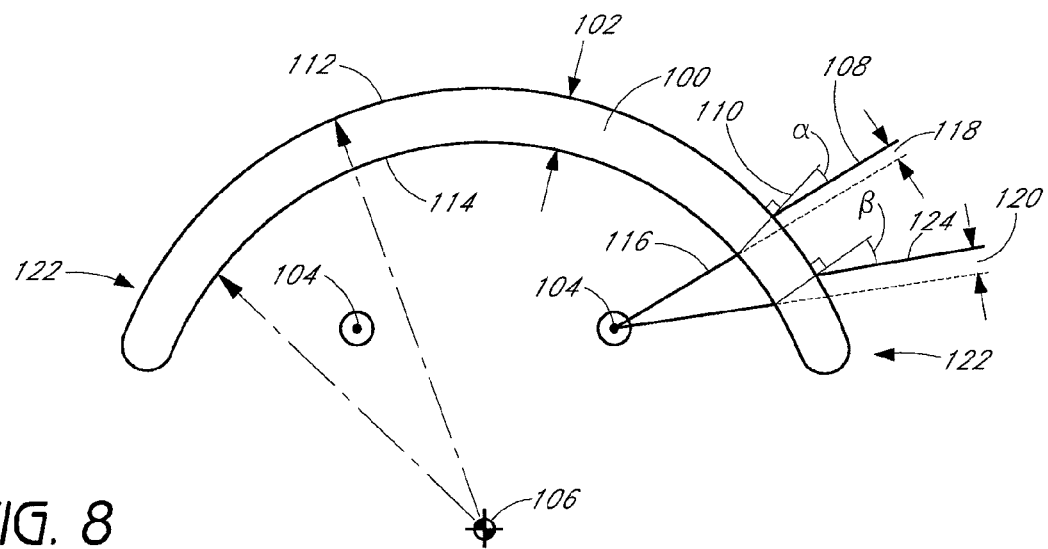
FIG. 8 is a schematic horizontal cross-sectional view of a horizontally constant radius unitary lens of uniform thickness illustrating the prismatic shift of light paths taken through the lens to the eye of a wearer.
Figure 9:
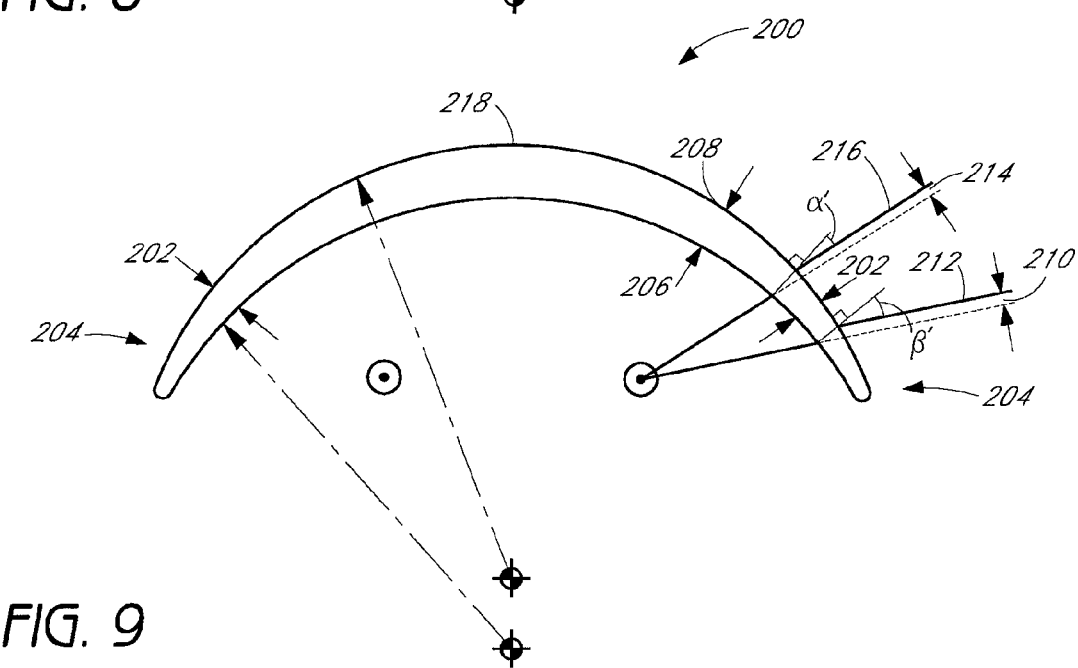
FIG. 9 is a schematic horizontal cross-sectional view of a horizontally constant radius unitary lens of tapered thickness illustrating the prismatic shift of light paths taken through the lens to the eye of a wearer.
Figure 10:
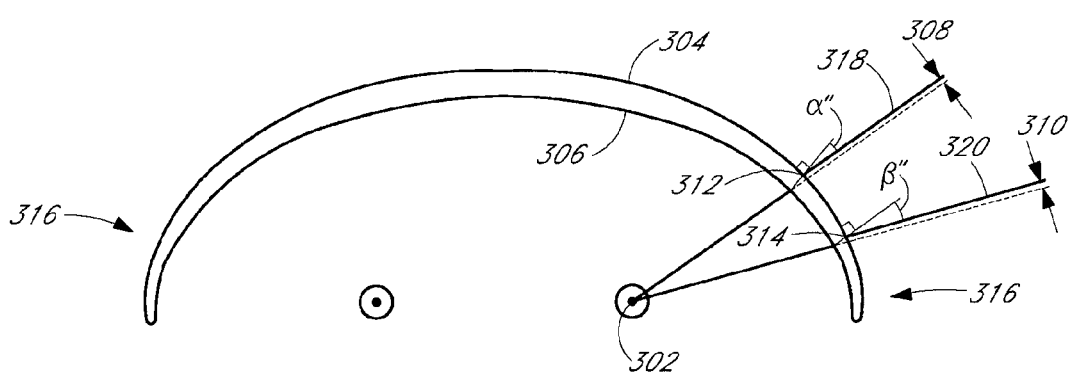
FIG. 10 is a schematic horizontal cross-sectional view of a tapered unitary lens illustrating the prismatic shift of light paths taken through the lens to the eye of a wearer.

Referring now to FIGS. 8-10, the optical performance of various prior art lens designs are illustrated. FIG. 8 schematically illustrates refraction in a prior art unitary lens 100 of constant radius horizontal cross-section, having a uniform thickness 102. With such a unitary lens 100, neither of a pair of eyes 104 are positioned at the center of curvature 106. Thus, the angle of incident rays from the lens 100 to each eye 104 changes throughout the angular range of vision. For example, a ray which shall be referred to as a medial light ray 108 strikes the lens 100 at an angle $\alpha$ to a normal line 110. As discussed above, bending of light at transmitting surfaces depends in part upon the angle of incidence of light rays. In this example, because the lens 100 is a cylindrical lens of uniform thickness, the ray 108 is refracted or bent in opposite directions at each of an outer surface 112 and an inner surface 114 of the lens 100, which results in a transmitted ray 116 parallel to the incident ray 108, which accounts for prismatic shift 118. The transmitted ray 116 is displaced, relative to the path of the medial incident ray 108, by a distance corresponding to the prismatic shift 118. This displacement is a first order source of optical distortion.

As also shown in FIG. 8, prismatic shift 120 is even more pronounced at a lateral end 122 of the lens 100 due to a greater angle of incidence $\beta$. A peripheral incident ray 124 thus experiences greater prismatic shift 120 (i.e. displacement) than the medial incident ray 108. The discrepancy between the prismatic shift 120 of the peripheral ray 124 and the prismatic shift 118 of the medial ray 110 results in a second order of optical distortion.

FIG. 9 illustrates an effort to compensate for the optical distortions caused by prismatic shift. Similar to the cylindrical lens 100 of uniform thickness discussed above, light is bent within the tapered lens 200. However, tapering produces a smaller lens thickness 202 in the direction of lateral end 204, relative to a lens thickness 206 at a more medial point 208. This smaller lens thickness 202 reduces an amount of displacement, i.e. prismatic shift 210, of a peripheral ray 212 relative to the prismatic shift 120 of the peripheral ray 124 through the untapered lens 100 of FIG. 8. In other words, lesser lens thickness 202 at the lateral end 204 of the tapered lens 200 compensates for a greater angle of incidence $\beta'$, relative to the thickness 206 and angle of incidence $\alpha'$ at the medial point 208. The lesser lens thickness 202 of the tapered lens 200 therefore results in a smaller difference between the prismatic shift 210 of the peripheral ray 212 and the prismatic shift 214 of the medial ray 216 on the lens 200. This difference is also smaller than the corresponding difference of the untapered lens 100 in FIG. 8, which results in a comparative reduction in the second order optical distortion. Note that the degree of correction of the second order distortion depends upon the differential thickness from the apex 218 to each lateral end 204.

In yet another attempt to reduce the prismatic shift of incident rays, FIG. 10 illustrates an elliptical tapered lens 300. The light rays pass through the lens 300 toward the wearer's eye 302 more closely normal to lens outer and inner surfaces 304, 306, throughout the wearer's angular range of vision. This results in a lesser prismatic shift 308, 310 at each respective point 312, 314 along the lens 300, relative to non-elliptical lenses 100, 200, and thus lessens first order optical distortion. This result is due to the shape of the elliptical lens 300 which can generally be characterized as having a curvature that increases toward the lateral ends 316, which accounts for some light rays passing more closely normal to the lens outer and inner surfaces 304, 306. The tightening curvature of the lens 300 towards the lateral ends 316 also accounts for the lower discrepancy between the prismatic shift 308 of a medial ray 318 and the prismatic shift 310 of a peripheral ray 320.

Figure 11:
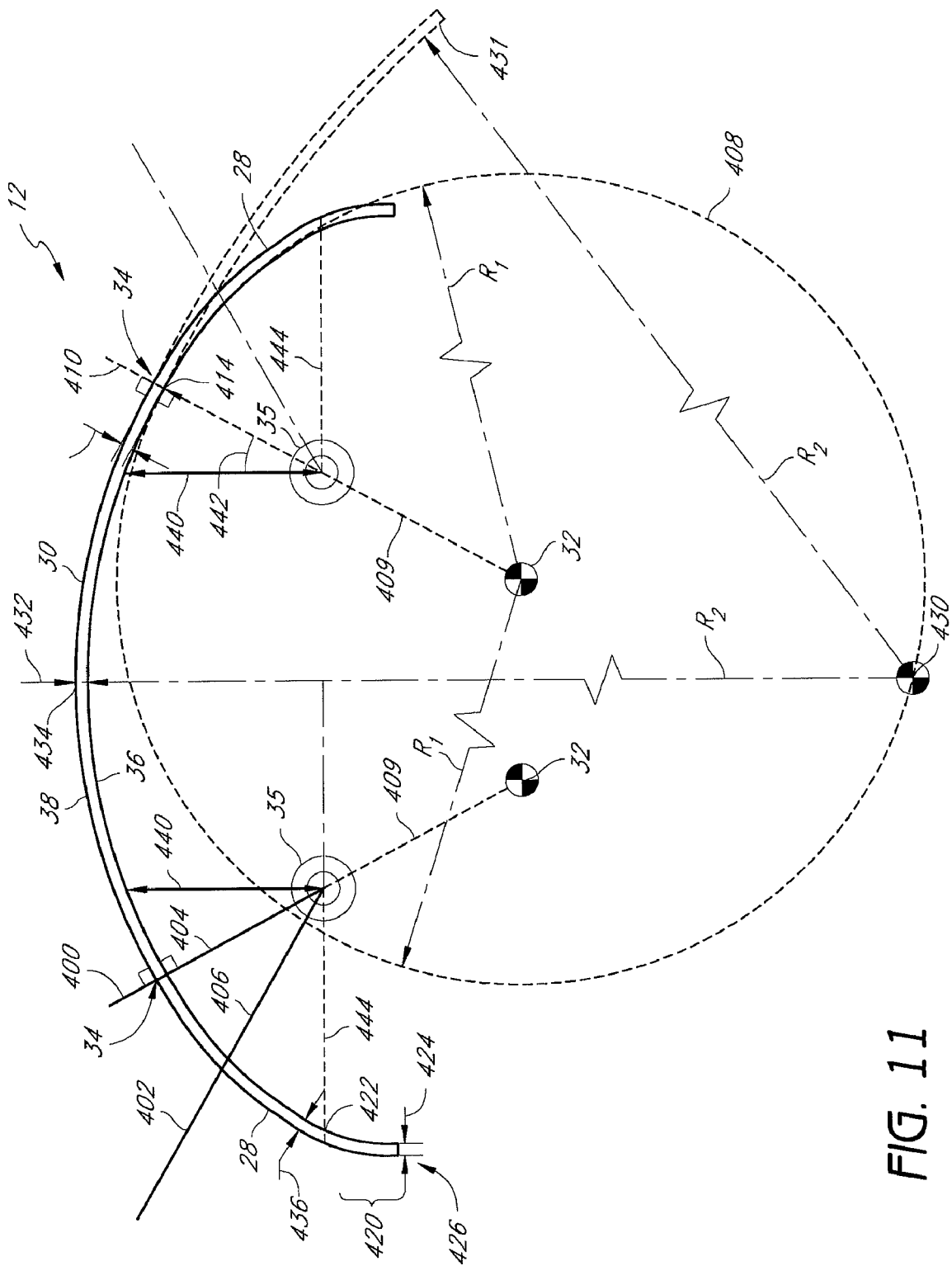
FIG. 11 is a horizontal cross-sectional view of a lens of the present invention taken along lines 4-4 in FIG. 2 illustrating transition sites and posterior sections of the lens, as well as first, second, and transition radii of curvature, in accordance with another embodiment.

By way of contrast, a central horizontal meridian of an embodiment of the quadroradial lens 12 of the present invention is shown in FIG. 11. As mentioned with respect to FIG. 4, the lens 12 has opposing lateral segments 28 and the central zone 30 disposed therebetween. Each lateral segment 28 has a first radius of curvature, designated $R_1$ that is measured from respective centers of curvature 32. Thus, medial and peripheral light rays 400, 402 pass through the lens 12 to the wearer's eyes 35 at a closer angle to normal to the lens 12 inner surface 38 in the lateral segments 28 of the lens 12.

Thus, as illustrated in FIG. 11, incident medial and peripheral light rays 400, 402 are transmitted through the lens 12 and undergo substantially minimal or negligible refraction and consequently, prismatic shift will tend to be lessened. In fact, in the embodiment shown in FIG. 11, the ray 400 can pass nearly perfectly normal to both of the lens inner and outer surfaces 36, 38 because the ray 400 passes through the lens 12 at approximately at the transition site 34. Further, ray 402 can also pass substantially closer normal in such an embodiment.

As a result, transmitted medial and peripheral light rays 404, 406 are not substantially deflected relative to the incident medial and peripheral light rays 400, 402. In this regard, first order optical distortion is substantially eliminated for the transmitted medial light ray 404, and minimal for the transmitted peripheral light ray 406. In addition, with minimal or negligible prismatic shift in the transmitted medial and peripheral light rays 404, 406, second order optical distortion is also substantially eliminated. The configuration of embodiments can be variously modified to further enhance the elimination of first and second order optical distortion. For example, the first and second radii of curvature, as well as the first and second centers of curvature, can be altered in order to optimize optical characteristics of the lens 12, including the elimination of prismatic shift and first and second order optical distortion.

These exceptional optical characteristics of embodiments, including the substantial reduction or elimination of prismatic shift in the lateral segments 28 of the lens 12 can be further explained with reference to the lens geometry in the lateral segments 28 and Snell's Law. In the embodiment of the lens 12 illustrated in FIG. 11, the inner and outer surfaces 36, 38 of the lateral segments 28 may be substantially parallel curvilinear surfaces and the wearer's eyes 35 may be positioned approximately at the respective centers of curvature of these lateral segments 28.

As illustrated, the transition site 34 can be disposed along a circular path 408, the center of which is the focal point 32 and the radius of which is the first radius of curvature $R_1$. The eye 35 can be positioned along a linear path 409 intermediate the focal point 32 and the transition site 34, which places the eye 35 in such a position that any rays incident upon the lens 12 at or nearby the transition site 34 will be normal to the inner and outer surfaces 36, 38 of the lens 12. This results because, as illustrated in FIG. 11, and as mentioned above, a normal line 410 of the circle 408 is one that is perpendicular to a tangent line 412 of the circle 408 at the point of intersection 414 of the circle 408 and the tangent line 412. Thus, the normal line 410 will pass through the center 32 of the circle 408 and ultimately can also be collinear with the radius $R_1$ of the circle 408. In this embodiment, the normal line 410 can be representative of the transmitted medial and peripheral rays 404, 406.

In another embodiment, the centers of rotation 32 can be respectively disposed approximately at the centers of the eyes 35. In such an embodiment, since the transmitted medial and peripheral rays would be approximately normal to the inner surface of the lens, the path of the incident light rays while passing through the lens will also be approximately normal to the inner surface. Finally, if the inner surface of the embodiment is approximately parallel to the outer surface and the incident medial and peripheral rays are approximately normal to the inner surface, the incident medial and peripheral rays must be about normal to the outer surface as well. Thus, the incident light rays would be normal to the outer surface. In this regard, no prismatic shift would occur in the lateral segments of the lens in such an embodiment, and therefore there is no first or second order optical distortion in the lateral segments of embodiments of the lens.

As shown in FIG. 11, in accordance with another embodiment, the lateral segment 28 of the lens 12 can also be formed to transition to posterior segments 420. The posterior segments 420 can represent that portion of the lens 12 adjacent the lateral segments 28 and extending posteriorly to enhance lateral protection of the eyes 35. In one embodiment, the posterior segment 420 can begin at a peripheral point 422 along the lens 12 where the inner surface 36 of the lens 12 diverges from the first radius of curvature $R_1$. The posterior segments 420 of the lens 12 can thus extend beyond the wearer's field of vision in order to block light rays and physical debris from entering from the rear of the lens 12.

In another embodiment shown in FIG. 11, the lens 12 in the posterior segments 420 can taper to a reduced lens thickness 424. Such an embodiment can be beneficial for light rays that pass through the posterior segments 420 of the lens 12 to the eyes 32 of the wearer, if the lens is configured such that the posterior segments 420 remain within the wearer's field of view. For example, light rays passing through the posterior segments may undergo slight prismatic shift. In order to reduce this prismatic shift in the posterior segments 420, the lens 12 can taper to a reduced thickness 424 in order to minimize the angle of incidence and the angle of refraction corresponding to a light ray passing through the posterior segment of the lens 12.

One of the benefits associated with the implementation of tapered posterior segments 420 is that the lens 12 can be configured to extend posteriorly beyond the limit of the wearer's normal field of vision. Little or no prismatic shift may occur should the wearer desire to look laterally through the posterior segments 420. This can be accomplished without requiring that the lens 12 follow a continuation of the arcuate path defined by the first radius of curvature $R_1$. In other words, the lens 12 can substantially conform to the shape of the wearer's head and thus have an aerodynamic and sleek configuration.

Referring again to the embodiment shown in FIG. 11, the central zone 30 of the lens 12 is illustrated as conforming to the second radius of curvature $R_2$. The second radius of curvature $R_2$ can be measured from a second center of curvature 430 to the inner surface 38 of the lens 12, and generally follow along a circular path 431 designated thereby. According to various embodiments disclosed herein, $R_1$ is preferably not equal to $R_2$. For example, $R_1$ can be less than or equal to $R_2$ ($R_1 \leq R_2$). Further, $R_2$ is preferably not equal to $R_3$. In this regard, $R_2$ can be less than or equal to $R_3$ ($R_2 \leq R_3$).

In preferred embodiments, the second radius of curvature $R_2$ can be greater than twice as much as the first radius of curvature $R_1$, as shown in the equation: $2 \times R_1 \leq R_2$. However, in some embodiments, $R_1$ can be in the range of about 1½ to 3 inches, and most preferably, approximately 2½ inches; $R_2$ can be in the range of about 4 to 10 inches, and most preferably, approximately 5 inches; and $R_3$ can be in the range of about 4 to 11 inches, and most preferably, approximately between 5-10 inches.

In accordance with another embodiment of the quadroradial lens 12, the lens 12 can be tapered. As described herein, embodiments of the lens 12 are preferably configured to exhibit good ballistic impact strength and durability. The inner surface 36 and the outer surface 38 define a thickness 432 therebetween along the central zone 30 of the lens 12. The central zone 30 of the lens 12 can be symmetrically disposed with respect to the lateral segments 28. In this regard, the central zone 30 can define a central point 434 which lies equidistant from either of the lateral segments 28. The lateral segments 28, as well as the posterior segments 420, can also be symmetrically disposed in the lens 12 relative to the central zone 30. For example, the central point 434 can be the point about which horizontal planes of the lens 12 exhibit symmetry. In this regard, the lens 12 can also be configured to be symmetrical about the central point 434.

The thickness 432 of the lens 12 can taper from a thickest point at the central point 434 of the lens 12 approaching the lateral segments 28 of the lens 12. Preferably, the thickness 432 of the lens 12 tapers at a substantially even rate from the central point 434 toward the opposing lateral segments 28.

In an additional implementation, the reduction in the thickness 432 of the lens 12 can occur only in the central zone 30, and the lateral segments 28 can be uniformly maintained at a lateral thickness 436. However, it is also contemplated that the thickness 432 of the lens 12 can taper from the central point 434 of the lens 12 continuously through the lateral segment 28 and, if so configured, the posterior segment 420.

In some embodiments, the average thickness of the lens 12 in the lateral segments 28 can be less than the average thickness of the lens 12 in the central zone 30. Additionally, the thickness 432 of the lens 12 in at least one point in the central zone 30 can be greater than the thickness 432 of the lens 12 at any point within at least one of the lateral segments. For example, the thickness 432 of the lens 12 can be within the range of 0.050 to 0.070 inches. In such an embodiment, the thickness 432 of the lens 12 in the central zone can be between about 0.060 and 0.070 inches and taper to between about 0.050 and 0.060 inches in the lateral segments. Most preferably, the thickness 432 of the lens 12 falls within 0.061 to 0.068 inches. In other embodiments, the thickness 432 of the lens 12 in the central zone 30 is 0.068 inches and gradually tapers to 0.061 inches at the lateral segments 28 of the lens 12.

Referring still to FIG. 11, the lens 12 can be configured such that the wearer's eye 35 is spaced from the inner surface 36 of the lens 12 at a vertex distance 440. The vertex distance 440 can be defined as the straight-ahead distance to the lens 12 as measured from the eye 35. The vertex distance 440 can preferably be between 1-2 inches.

Further, the eye 35 can also be positioned such that the eye 35 is spaced relative to the lens 12 at the vertex distance 440 and angularly spaced from the transition site 34 at an angle 442, as shown in FIG. 11. In other words, the angle 442 can represent the angular spacing between a path from the eye 35 along the vertex distance 440 and a path from the eye 35 toward the transition site 34. In a preferred embodiment, the angle 442 can be between 25° and 60°. As indicated above, the modification of these parameters and configurations can be performed in order to enhance the optical qualities of the lens 12.

Referring still to FIG. 11, an additional embodiment of the lens 12 can be configured with the lateral segments 28 transitioning to the posterior segments 420 at a point where the lens 12 intersects with a meridian line 444. As illustrated in FIG. 11, the meridian line 444 can be defined as the line along which the eyes 35 lie. The configuration and spacing of the vertex distance 440, the angle 442, and the meridian line 444 can be variously modified in order to accommodate different users and head types. Such modifications may be performed by one of skill in the art provided these teachings.

Referring again to FIG. 11, embodiments of the quadroradial lens 12 can also include the transition sites 34. As mentioned briefly above, the transition sites 34 are disposed intermediate the opposing the lateral segments 28 and the central zone 30. The transition sites 34 can be defined as that portion of the lens 12 intermediate an end point of central zone 30 and a beginning point of the lateral segment 28. In accordance with a preferred embodiment, the transition sites 34 can be the point at which the central zone 30, defined by the circular path 431 of the radius of curvature $R_2$, is coincident with the lateral segments 28, defined by the circular path 408 of the radii of curvature $R_1$. However, the transition site 34 can also be a section of the lens 12 wherealong the curvature of the lens 12 varies.

In some embodiments, each transition site 34 can have a corresponding transition center of curvature for a given point along the inner surface 38 of the lens 12. The center of curvature for a given point along a given transition site 34 may vary in location and may not be located at the same position for another given point along the inner surface 36 of the lens 12 at the given transition site 34. In such an embodiment, the transition radius of curvature can vary continuously. It is contemplated that the transition radius of curvature can increase or decrease at a constant rate, which can provide preferred optical characteristics. However, the transition radius of curvature can also increase or decrease at a variable rate, such as by an exponential rate corresponding to a comparison of $R_1$ and $R_2$ and a length of the transition site 34. Thus, the transition radius of curvature can vary as desired between the first and second radii of curvature $R_1$ and $R_2$.

For example, according to one embodiment of the lens 12, the transition site 34 may have a transition radius of curvature that can be equal to the second radius of curvature $R_2$ of the central zone 30 and subsequently decrease through the transition site 34 toward the lateral segment 28 until being equal to the first radius of curvature $R_1$ at the lateral segment 28. Such a configuration can tend to mitigate any optical distortion due to irregular contouring of the lens 12 that may occur during a transition between the first and second radii of curvature $R_1$ and $R_2$. In particular, such a configuration may be particularly beneficial if used along the inner surface 36 of the lens 12 in order to minimize or eliminate prismatic shift.

In accordance with yet another embodiment, the transition radius of curvature can be constant throughout the transition site 34. It is also contemplated that the transition site 34 can be substantially linear according to a horizontal cross-sectional view of the transition sites. However, in such embodiments, the transition site 34 may not form a smooth, continuous contour, but may instead be marked by an elbow or ridge line between adjacent portions of the lens 12. Such an attribute can be disadvantageous for certain applications, but is nevertheless a contemplated alternative feature in embodiments of the lens 12. Preferably, the transition sites 34 can be formed to provide a smooth arcuate transition from the central zone 30 to either of the respective lateral segments 28 of the lens 12.

Figure 12:
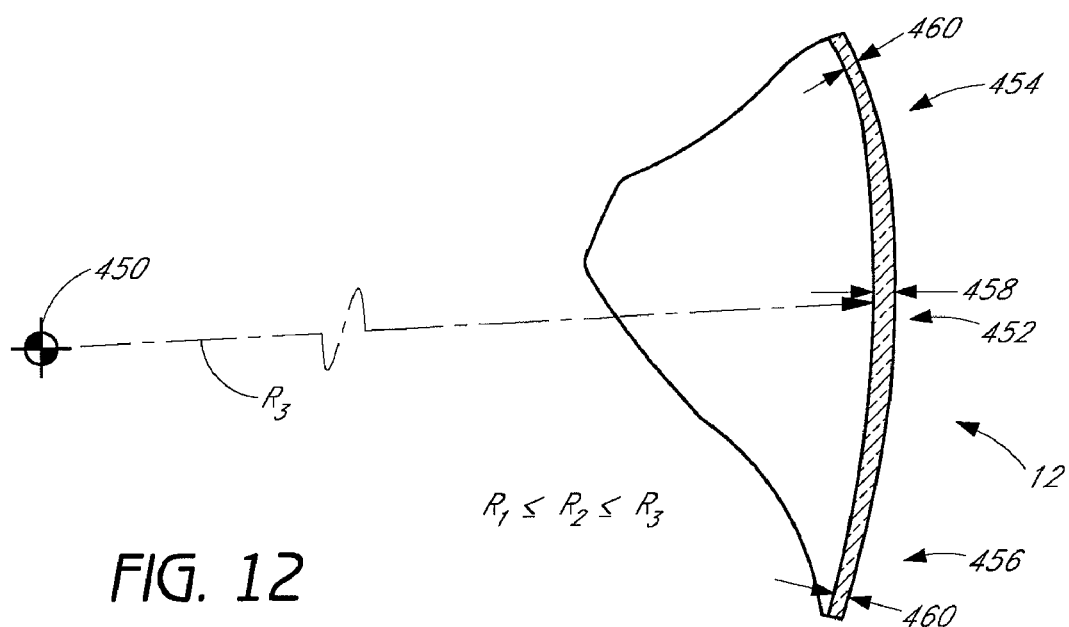
FIG. 12 is a vertical cross-sectional view of yet another embodiment of the lens taken along lines 5-5 in FIG. 2.
Figure 13A:
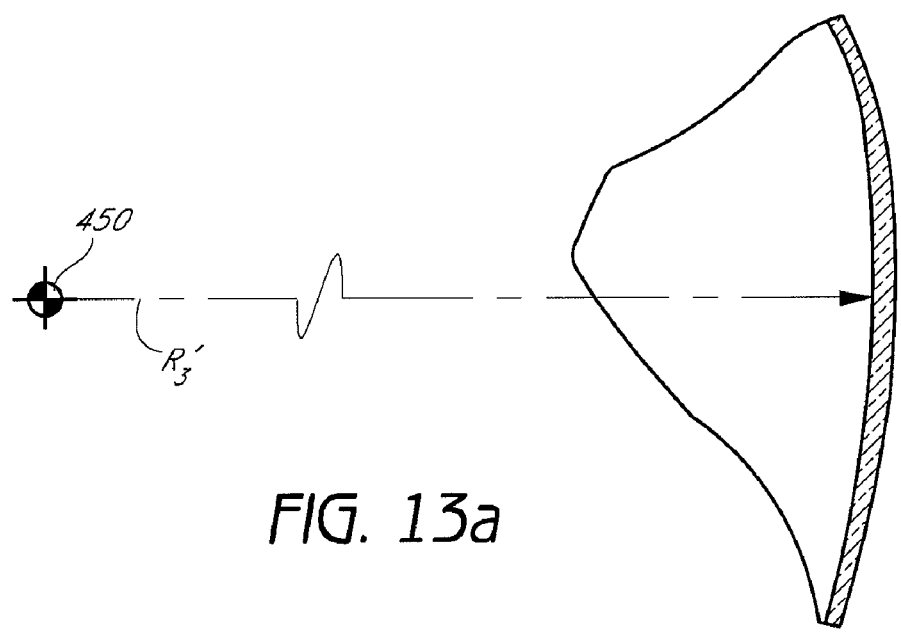
FIG. 13A-C are vertical cross-sectional views of the lens of FIG. 2 taken along the lines 13A-13A, 13B-13B, and 13C-13C, respectively, of FIG. 2, illustrating an embodiment of the lens wherein a vertical radius of curvature changes along the lens.

Referring yet again to FIG. 5 and additionally to FIGS. 12-13A-C, the second arcuate cross-sectional configuration of the lens 12 in a vertical direction is shown. As mentioned above, the second arcuate cross-sectional configuration of the lens 12 has a third radius of curvature designated $R_3$. Corresponding to this third radius of curvature $R_3$ is a third center of curvature 450. In an embodiment of the quadroradial lens 12, the third center of curvature 450 can be disposed in the same horizontal plane as the wearer's eyes in the as-worn orientation. Alternatively, the third center 450 can be elevated vertically to a point above the horizontal plane of the wearer's eye center, to rake the lens and conform more closely to certain head forms. In certain helmet shields and other applications, the third center 450 may be positioned below the eye level, to tilt the shield upwardly depending upon the desired performance.

According to another embodiment of the present invention illustrated in FIG. 12, the lens 12 can be tapered in the vertical direction. As similarly indicated above with respect to the posterior segments 420, in order to reduce the prismatic shift in the upper and lower sections 454, 456, the lens 12 can taper from a central thickness 458 to a reduced distal thickness 460 in order to minimize the angle of incidence and the angle of refraction corresponding to a light ray passing through the upper section 454 or lower section 456 of the lens 12.

Figure 13B:
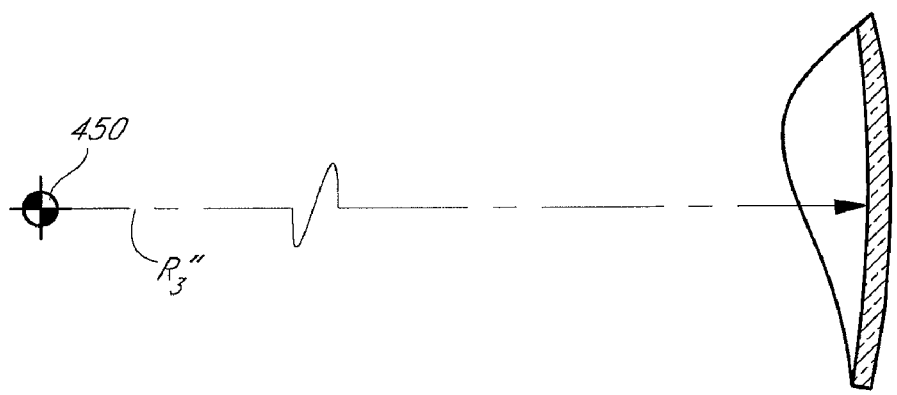
Figure 13C:
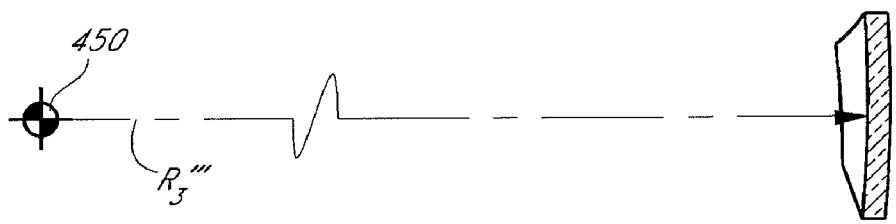

FIGS. 13A-C show cross-sectional views taken along FIG. 2 according to yet another embodiment of the lens 12. As illustrated therein, the third radius of curvature $R_3$, i.e. vertical radius of curvature, can change moving along the lens 12 in the horizontal plane. For example, the third radius of curvature $R_3'$ in the central zone 30 of the lens 12 (illustrated in FIG. 13A) can differ from the third radius of curvature $R_3''$ at the transition site 34 of the lens 12 (illustrated in FIG. 13B), and both the $R_3'$ and $R_3''$ can differ from the third radius of curvature $R_3'''$ in the lateral segments 28 of the lens 12 (illustrated in FIG. 13C). In the embodiment shown in FIGS. 13A-C, the third radius of curvature increases moving along the lens 12 in a horizontal direction, such as from the central zone 30 to the transition site 34 to the lateral segment 28.

For example, the third radius of curvature can increase (or decrease) beginning from the central zone 30 (perhaps from the central point 434) and continue to increase through the transition site 34 moving toward the lateral segments 28 of the lens 12. Further, although the third radius of curvature $R_3$ can increase to any distance, such as within a range of 7 to 40 inches, the third radius of curvature $R_3$ is preferably a maximum of 10 inches. For example, in an embodiment where the third radius of curvature $R_3$ is 5 inches throughout the central zone 30, the third radius of curvature $R_3$ can increase toward 10 inches in the lateral segments 28. In addition, the third radius of curvature $R_3$ can increase throughout the lens 12 or increase only through a portion of the lens 12.

According to an implementation, any increase in the third radius of curvature $R_3$ can be done at any rate, and can be altered to achieve desired optical characteristics. For example, the third radius of curvature $R_3$ can increase in a mathematically linear fashion, as illustrated in the cross-sectional views of FIGS. 13A-C. However, the third radius of curvature $R_3$ can become increasingly greater, as desired. These teachings can be utilized to variously modify the geometry of the lens 12 regarding the placement and rate of change of the third radius of curvature $R_3$. Prismatic shift can further be minimized and aesthetic quality of the lens 12 can be improved through implementation of these teachings.

It is contemplated that the third radius of curvature $R_3$ can be within a broad range, such as about 6 to 14 inches. In addition, it is further contemplated in embodiments of the quadroradial lens 12, that the third radius of curvature $R_3$ be much greater than either of the first or second radii of curvature $R_1$ or $R_2$, as illustrated in the following mathematical relationship: $R_1 << R_2 \leqq R_3$. The third radius of curvature $R_3$ can also correspond to be equal to the first and second radii of curvature $R_1$ and $R_2$, which can advantageously reduce prismatic shift for light ray entering through an upper section 454 or lower section 456 of the lens 12.

In a preferred embodiment of the present invention, the lens thickness is tapered along each of a central horizontal meridian and a central vertical meridian. The taper may be accomplished by de-centering the radii of curvature of the front and rear surfaces, thereby creating an optical center line through the lens or in association with the lens. Preferably, the eyeglass is mounted such that the optical center line remains within about 12°, preferably within about 8°, and, more preferably, within about 5° of a wearer's reference line of sight. The wearer's reference line of sight may be a theoretical straight ahead normal line of sight. Details concerning the relationship of lens tapering, optical center lines and straight ahead lines of sight for the purpose of minimizing prismatic shift are disclosed in U.S. Pat. No. 4,515,448 to Tackles, U.S. Pat. No. 4,859,048 to Jannard, and U.S. Pat. No. 6,168,271 to Houston, et al., the disclosures of each of which is hereby incorporated by reference in its entirety herein.

As noted above with respect to FIG. 2, the vertical curvature and front shape of the lens 12 can advantageously be shaped. Other optical advantages, including as the reduction or elimination of prismatic shift, can similarly be obtained through manipulation of the vertical configuration of the lens 12. In this regard, the third radius of curvature $R_3$ can be varied, higher or lower than the 4-11 inch range, in order to avail the wearer of such additional optical benefits.

Although this invention has been described in terms of certain preferred embodiments, other embodiments that are apparent to those of ordinary skill in the art are also within the scope of this invention. Accordingly, the scope of this invention is intended to be limited only by the appended claims.

What is claimed is:

1. An arcuately molded lens for eyeglasses, the lens being suitable for participation in active sports, such as biking, skiing, and the like, the lens comprising:
  a single pane, unitary lens defining upper and lower edges, the lower edge having a nosepiece opening formed therein for mounting the lens on a nose of a wearer,
  the lens having a first arcuate cross-sectional configuration in a horizontal direction, the first arcuate cross-sectional configuration defining opposing lateral segments and a central zone interposed therebetween, the opposing lateral segments being oriented tangentially relative to the central zone, the lateral segments each having a first radius of curvature designated $R_1$, the central zone having a second radius of curvature designated $R_2$, the lens having a second arcuate cross-sectional configuration in a vertical direction, the second arcuate cross-sectional configuration having a third radius of curvature designated $R_3$, the third radius of curvature increasing along the lens from a minimum at a center point of the central zone to a maximum in the lateral segments thereof, wherein $R_1 \neq R_2$.

2. The lens of claim 1 wherein $R_1 < R_2$.

3. The lens of claim 1 wherein $R_1$ is in the range of about 1 to 3½ inches.

4. The lens of claim 1 wherein $R_2$ is in the range of about 4 to 10 inches.

5. The lens of claim 1 wherein the lens defines inner and outer surfaces and a thickness therebetween, wherein an average thickness of the lens in the lateral segments of the lens is less than an average thickness of the lens in the central zone.

6. The lens of claim 5 wherein the central zone is substantially symmetrically located with respect to the nosepiece and the lateral segments adjacent either side of the central zone, the thickness of the lens being in at least one point in the central zone greater than the thickness of the lens at any point within at least one of the lateral segments.

7. The lens of claim 5 wherein the thickness of the lens at a central point tapers gradually to a reduced thickness in the lateral segments.

8. The lens of claim 7 wherein the lens thickness is in the range of about 0.061 to 0.068 inches.

9. The lens of claim 1 wherein the opposing lateral segments are oriented tangentially relative to the central zone at respective opposing transition sites, the transition sites being positioned along the lens with normal lines extending from an interior surface of the lens at the respective transition sites being oriented transversely relative to a central axis of the lens, the lens being adapted to the wearer with the normal lines extending through the wearer's eyes for reducing prismatic shift.

10. The lens of claim 9 wherein the normal lines are oriented at an angle with respect to the central axis of the lens, the angle being approximately 30°.

11. The lens of claim 1 wherein $R_3$ varies between about 4 to 11 inches.

12. An arcuately molded lens for eyeglasses, the lens being suitable for participation in active sports, such as biking, skiing, and the like, the lens comprising:

a single pane, unitary lens defining upper and lower edges, the lower edge having a nosepiece opening formed therein for mounting the lens on a nose of a wearer, the lens having a first arcuate cross-sectional configuration in a horizontal direction, the first arcuate cross-sectional configuration defining opposing lateral segments and a central zone interposed therebetween, the lateral segments each having a first radius of curvature designated $R_1$, the central zone having a second radius of curvature designated $R_2$, the lens having a second arcuate cross-sectional configuration in a vertical direction, the second arcuate cross-sectional configuration having a third radius of curvature designated $R_3$, the third radius of curvature increasing along the lens from a minimum at a center point of the central zone to a maximum in the lateral segments thereof, wherein $R_1 \neq R_2 \neq R_3$.

13. The lens of claim 12 wherein $R_1 < R_2$.

14. The lens of claim 13 wherein $R_2 \leq R_3$.

15. The lens of claim 12 wherein $R_3$ varies along a horizontal plane of the lens.

16. The lens of claim 15 wherein $R_3$ increases along the horizontal plane from the central zone toward the lateral segment of the lens.

17. The lens of claim 16 wherein $R_3$ varies between about 4 to 11 inches.

18. The lens of claim 12 wherein $R_3$ is in the range of about 4 to 11 inches.

19. An arcuately molded lens for eyewear, comprising:

a lens defining upper and lower edges, at least the upper edge being cooperatively attachable to a frame;

the lens having a first arcuate cross-sectional configuration in a horizontal direction, the first arcuate cross-sectional configuration defining opposing lateral segments and a central zone, the central zone being symmetrically located with respect to a central vertical plane of symmetry, the lateral segments, the lateral segments each having a first radius of curvature designated $R_1$, the central zone having a second radius of curvature designated $R_2$, the first radius of curvature $R_1$ being coincident with the second radius of curvature designated $R_2$ at transition sites of the lens, the lens having a second arcuate cross-sectional configuration in a vertical direction, the second arcuate cross-sectional configuration having a third radius of curvature designated $R_3$, the third radius of curvature $R_3$ increasing along a horizontal plane from the central zone toward the respective ones of the lateral segments of the lens, wherein $R_1 < R_2 \leq R_3$.

* * * * *

UNITED STATES PATENT AND TRADEMARK OFFICE
CERTIFICATE OF CORRECTION

PATENT NO. : 7,448,750 B2  Page 1 of 1
APPLICATION NO. : 11/534581
DATED : November 11, 2008
INVENTOR(S) : George J. Tackles It is certified that error appears in the above-identified patent and that said Letters Patent is hereby corrected as shown below:

At column 1, title, please delete "QUADRILATERAL" and insert
-- QUADRORADIAL --, therefore.

Signed and Sealed this

Thirteenth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,448,750 B2 | Page 1 of 1 |
| APPLICATION NO. | : 11/534581 | |
| DATED | : November 11, 2008 | |
| INVENTOR(S) | : George J. Tackles | |

It is certified that error appears in the above-identified patent and that said Letters Patent is hereby corrected as shown below:

Title Page, Item [54] and Column 1, line 1, title, please delete "QUADRILATERAL" and insert -- QUADRORADIAL --, therefore.

This certificate supersedes the Certificate of Correction issued January 13, 2009.

Signed and Sealed this

Third Day of February, 2009

JOHN DOLL
*Acting Director of the United States Patent and Trademark Office*